(12) United States Patent
Anhut et al.

(10) Patent No.: US 11,966,036 B2
(45) Date of Patent: Apr. 23, 2024

(54) LIGHT MICROSCOPE AND MICROSCOPY METHOD

(71) Applicant: Carl Zeiss Microscopy GmbH, Jena (DE)

(72) Inventors: Tiemo Anhut, Jena (DE); Daniel Schwedt, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 494 days.

(21) Appl. No.: 17/296,623

(22) PCT Filed: Nov. 7, 2019

(86) PCT No.: PCT/EP2019/080616
§ 371 (c)(1),
(2) Date: May 25, 2021

(87) PCT Pub. No.: WO2020/108948
PCT Pub. Date: Jun. 4, 2020

(65) Prior Publication Data
US 2022/0019067 A1    Jan. 20, 2022

(30) Foreign Application Priority Data
Nov. 26, 2018    (DE) .................... 10 2018 129 657.6

(51) Int. Cl.
*G02B 21/00* (2006.01)
*G01N 21/64* (2006.01)
*G02B 21/04* (2006.01)

(52) U.S. Cl.
CPC ..... *G02B 21/0032* (2013.01); *G01N 21/6458* (2013.01); *G02B 21/0076* (2013.01); *G02B 21/008* (2013.01); *G02B 21/04* (2013.01)

(58) Field of Classification Search
CPC ............ G02B 21/0032; G02B 21/0076; G02B 21/008; G02B 21/04; G02B 21/00;
(Continued)

(56) References Cited

U.S. PATENT DOCUMENTS 6,588,900 B1    7/2003  Le Gargasson et al.
9,470,883 B2 *  10/2016 Kalkbrenner ............ G02B 6/06
(Continued)

FOREIGN PATENT DOCUMENTS

DE    102013015931 A1    3/2015
DE    102016119727 A1    4/2018
(Continued)

OTHER PUBLICATIONS

German Search Report dated Apr. 2, 2019 for DE 10 2018 129 657.6.
(Continued)

*Primary Examiner* — Arnel C Lavarias
(74) *Attorney, Agent, or Firm* — Duane Morris LLP

(57) ABSTRACT

A light microscope having a scanner for scanning a sample with illuminating light and a light detector for measuring sample light. A microlens array having a plurality of microlenses is arranged in front of the light detector in the region of a pupil plane. The light detector respectively has a plurality of detector elements behind each microlens and has a complete readout frequency of at least 100 kHz. By means of the detector elements arranged behind the respective microlens, a wavefront datum regarding the sample light is determined. Moreover, a sample point signal is computed from signals of the detector elements. Illuminating light is successively deflected onto different sample points with the scanner and corresponding sample point signals are captured, wherein, for at least some of the different sample points, a corresponding wavefront datum is also determined.

(Continued)

The determined wavefront data can be taken into account in a calculation of a sample image from the plurality of sample point signals.

18 Claims, 4 Drawing Sheets

(58) Field of Classification Search
CPC .............. G02B 21/0004; G02B 21/002; G02B 21/0024; G02B 21/0036; G02B 21/0052; G02B 21/006; G02B 21/06; G02B 21/36; G02B 21/361; G02B 21/365; G02B 21/367; G01N 21/6458; G01N 2021/6463; G01N 21/6486
USPC ........ 359/385, 362, 363, 368, 369, 388, 389
See application file for complete search history.

(56) References Cited

U.S. PATENT DOCUMENTS

| | | | |
|---|---|---|---|
| 9,507,134 | B2 | 11/2016 | Levecq et al. |
| 2004/0223214 | A1* | 11/2004 | Atkinson ............. G02B 21/002 359/368 |
| 2012/0061554 | A1 | 3/2012 | Cui et al. |
| 2015/0185454 | A1 | 7/2015 | Kalkbrenner et al. |
| 2015/0362713 | A1* | 12/2015 | Betzig ................. G02B 21/006 250/459.1 |
| 2016/0003740 | A1 | 1/2016 | Tao et al. |
| 2016/0091705 | A1* | 3/2016 | Ben Ezra ............. G02B 21/361 348/79 |
| 2017/0205615 | A1 | 7/2017 | Vaziri et al. |

FOREIGN PATENT DOCUMENTS

| | | |
|---|---|---|
| DE | 102016119730 A1 | 4/2018 |
| JP | H10311950 A | 11/1998 |
| JP | 2002228543 A | 8/2002 |
| JP | 2008110175 A | 5/2008 |
| JP | 2009103958 A | 5/2009 |
| JP | 2009178502 A | 8/2009 |
| JP | 2012010790 A | 1/2012 |
| JP | 2015229014 A | 12/2015 |
| WO | 2017158695 A1 | 9/2017 |

OTHER PUBLICATIONS

Wang, et al.; "Rapid Adaptive Optical Recovery of Optimal Resolution Over Large Volumes"; Nature Methods 2014; 11(6):625-628.

Polo, A., et al.; "Linear Phase Retrieval for Real-Time Adaptive Optics": J. Europe Opt. Soc. Rap. Public 2013; 8:13070-1-13070-5.

Sep. 4, 2023 Notice of Reasons for Refusal issued by the Japanese Patent Office for Japanese Patent Application No. 2021-528348 (English translation included).

Aug. 24, 2023 Search Report issued by Registered Search Organization for Japanese Patent Application No. 2021-528348 (English translation included).

* cited by examiner

LIGHT MICROSCOPE AND MICROSCOPY METHOD

RELATED APPLICATIONS

The present application is a U.S. National Stage application of International PCT Application No. PCT/EP2019/080616 filed on Nov. 7, 2019 which claims priority benefit of German Application No. DE 10 2018 129 657.6 filed on Nov. 26, 2018, the contents of each are incorporated by reference in their entirety.

FIELD OF THE INVENTION

In a first aspect, the present invention relates to a light microscope. In a second aspect, the invention relates to a microscopy method.

BACKGROUND OF THE INVENTION

In order to realize a microscope image of the highest possible quality, it is advantageous to know the wavefront in the light path of the microscope.

The wavefront of illuminating light directed onto a sample to be analysed and the wavefront of sample light to be detected can in particular be altered by optically complex media. These kinds of media can exhibit refractive index inhomogeneities and corrupt the point image function (point spread function) through multiple scattering on small particles. Should the illuminating light and the sample light pass through such media, the detected measurement signals are based not only on the sample area under analysis, but are also influenced by the other media that the light has passed through. The excitation becomes inefficient so that higher illuminating light intensities become necessary, which in turn can lead to photodamage of the sample.

For the detection and potential compensation of such interference, the direct wavefront measurement by a wavefront sensor in the pupil plane and the indirect wavefront computation via measurements around an image plane are known and will be described in greater detail in the following.

A generic light microscope is based on a direct wavefront measurement of the sample light in the pupil plane, that is to say a conjugate plane of the objective pupil. A light microscope of this kind is described, for example, in: "Rapid Adaptive Optical Recovery of Optimal Resolution over Large Volumes" by Wang et al., published in Nature Methods. 2014 June, 11(6):625-8. doi: 10.1038/nmeth.2925. This kind of generic light microscope comprises a scanner for scanning a sample with illuminating light and a light detector for measuring sample light. For example, it is possible to excite a fluorescence of the sample with the illuminating light so that the sample light is fluorescent light. The light microscope further comprises a microlens array comprising a plurality of microlenses arranged before the light detector in the area of the pupil plane. The light detector in turn comprises a plurality of detector elements and a plurality of these detector elements are arranged behind each microlens.

Accordingly, a generic microscopy method comprises the steps of scanning a sample with illuminating light by means of a scanner and guiding sample light from the sample to a light detector by means of a microlens array. The microlens array comprises a plurality of microlenses and is arranged in the area of a pupil plane. The light detector comprises a plurality of detector elements, wherein a plurality of the detector elements are respectively arranged behind each microlens.

This type of arrangement of a microlens array and a light detector, which allows the measurement of the wavefront, is also known as a Shack-Hartmann sensor. The form or curvature of the wavefront determines in which direction a microlens refracts and focuses incident light. The detector elements behind the microlens thus enable a determination of the local wavefront curvature of the incident light. Implementing a plurality of microlenses allows a precise measurement of the wavefront over the entire cross-section of the beam of light.

Using determined wavefront data to adjust an adaptive optic is known. The adaptive optic can be, for example, a deformable mirror arranged in the path of the illuminating light. The deformable mirror is adjusted by means of the wavefront data so as to at least partially compensate aberrations or the undesired alteration of the wavefront caused by optically complex media.

A conventional light microscope with a direct wavefront measurement—as described, for example, in the article by Wang et al. mentioned above—splits the sample light and directs a part onto the Shack-Hartmann sensor (which comprises, e.g., an EMCCD camera chip). Another part of the sample light is measured with a separate detector (e.g. a photomultiplier, PMT) and used to generate the sample image. Separate detectors are used as the pixel dwell time of a laser scanning microscope that scans quickly is shorter than the measurement time of the Shack-Hartmann sensor according to the prior art. The part of the sample light that hits the Shack-Hartmann sensor is not available for the generation of the sample image. A significant part of the sample light is thus unusable for the actual imaging process in conventional light microscopes.

A further disadvantage of conventional light microscopes is their low compensation speed. An individual compensation via the adaptive optic is not possible per scanned sample point. Rather, the Shack-Hartmann sensor only determines a wavefront for a larger sample area due to its longer measuring time. The adaptive optic is accordingly also only adjusted per larger sample area even when there are large variations within this sample area in terms of how the wavefront is influenced.

A Hartmann-Shack sensor for measuring the wavefront in the pupil plane is also known as a direct wavefront sensor. Direct measurement in the pupil plane is important for a precise measurement of the wavefront. Indirect wavefront measurements, which are usually performed in a plurality of planes around an image plane, are less informative. The greater the distortion of the wavefront, the greater the number of required planes in which an imaging with subsequent data evaluation occurs. A data evaluation for this kind of indirect wavefront sensor is described in "Linear phase retrieval for real-time adaptive optics" by A. Polo et al, published in J. Europ. Opt. Soc. Rap. Public. 8, 13070 (2013). A corresponding light microscope with an indirect wavefront sensor is disclosed in US 2015/0185454 A1 and DE 10 2013 015 931 A1. A phase can be reconstructed from the captured data, wherein a plurality of measurements in different planes is necessary for exact results. Moreover, this type of reconstruction of the wavefront only works with relatively small aberrations and low measurement noise.

The direct wavefront sensors described in the foregoing are thus superior for precise results: via their arrangement in the pupil, they allow a measurement of the wavefront instead of carrying out a reconstruction of the wavefront from the captured image data. As mentioned above, there is, however, the drawback with a direct wavefront sensor that a considerable portion of the sample light is used for the measurement with the wavefront sensor and is not available for the actual sample imaging.

SUMMARY OF THE INVENTION

The indication of a light microscope and a microscopy method which allow a sample imaging and a wavefront measurement that are particularly precise and efficient with a structure that is particularly simple can be considered an object of the invention.

This object is achieved by means of the light microscope with the features of claim 1 and by means of the method with the features of claim 17.

Advantageous variants of the light microscope according to the invention and of the microscopy method according to the invention are the object of the dependent claims and are also explained in the following description.

In the light microscope of the above-described type, the light detector has a complete readout frequency of at least 100 kHz. Moreover, an electronics unit is also provided and is configured to:

measure intensity distributions with the detector elements arranged behind the respective microlenses and derive a wavefront datum/wavefront information regarding the sample light therefrom;

compute a sample point signal from a plurality of signals or all signals of the detector elements, in particular by addition or integration of the same, and successively direct illuminating light onto different sample points with the scanner and capture corresponding sample point signals, wherein, for at least some of the different sample points, a corresponding wavefront datum regarding the sample light is determined.

The electronics unit can then compute in particular a sample image from the plurality of sample point signals, the determined wavefront data/wavefront information being taken into account in the computation of the sample image. The wavefront data and the sample point signals are acquired with the same detector elements.

In the method of the above-described type according to the present invention, the detector elements are read out with a frequency that is within a pixel dwell time with which the scanning of the sample occurs. Intensity distributions are measured with the detector elements arranged behind the respective microlenses and a wavefront datum regarding the sample light is derived therefrom. Moreover, a sample point signal is also computed from the signals of the detector elements. Illuminating light is directed successively onto different sample points with the scanner and corresponding sample point signals are captured. For at least some of the different sample points, a corresponding wavefront datum regarding the sample light is also determined. A sample image can then be computed from the plurality of sample point signals, the determined wavefront data being taken into account in the calculation of the sample image.

Intensity distributions are respectively measured for every microlens or at least a plurality of the microlenses by means of the detector elements arranged behind the respective microlenses. The intensity distribution is characteristic of the wavefront form at the corresponding microlens. The intensity distributions or a datum derived therefrom can thus be used as a measure of the wavefront. The electronics unit can determine a focus position for a plurality of the microlenses or for every microlens by means of the detector elements arranged behind the respective microlenses. The plurality of focus positions determined in this manner can be considered wavefront data. Alternatively, a wavefront datum can be derived from the focus positions. In principle, any datum that is characteristic of a wavefront form can be considered wavefront data. In the present text, the terms "wavefront" and "wavefront data" can be interchangeable.

Conventionally, a Shack-Hartmann sensor generally performed a slow measurement while the plurality of sample points were successively scanned. The readout thus takes longer than a pixel dwell time with conventional methods. Two separate detectors were thus necessary: a detector for the Shack-Hartmann sensor and another (faster) detector for capturing the sample image signals. According to the invention, a second detector is not necessary in this connection. By using a light detector with a complete readout frequency of at least 100 kHz, in particular at least 200 kHz or at least 1 MHz, the readout of all necessary detector elements can occur within exactly one pixel dwell time. The pixel dwell time can accordingly have a value that is in particular lower than or equal to 10 µs or 5 µs or lower than or equal to 1 µs. The detector elements thus emit a signal for every sample point that has been scanned. In cases where the pixel dwell time is particularly short, it can be provided that not all detector elements are read out so that the readout frequency for the used detector elements ends up being higher than the complete readout frequency.

The pixel dwell time can denote the time span from one light pulse to the next light pulse during a pulsed illumination, wherein the light pulses are directed by the scanner onto different sample points. If there is a continuous illumination, the period of time during which a given sample point is illuminated can be considered the pixel dwell time. The pixel dwell time can in particular be understood to be a definable length of time after which the measurement signal is allocated to the next sample point/pixel. The measurement signal captured by a detector element is integrated within the pixel dwell time. In cases where a plurality of measurement signals are successively captured by a detector element within the pixel dwell time, these can be added together. When a plurality of measurement signals are successively captured within the pixel dwell time, these can correspond to different pixel sub-areas as a result of the continuous movement of the scanner, for example when oversampling is employed. When a pixel dwell time expires, the measurement signal captured during the next pixel dwell time is allocated to the next sample point/pixel.

In order to enable a readout of the detector elements with the required speed, these can be photon-counting detector elements, in particular single-photon avalanche diodes. Photon-counting detector elements have a substantially higher amplification compared with detectors used in conventional Shack-Hartmann sensors and thus permit faster measurements up to rates in the MHz range. It is thereby possible to capture measurement signals for every sample point to be scanned in a large range of pixel dwell times. For fast photon-counting detector elements to be feasible, the rate of incident photons must not be too high. In this connection, arranging the microlens array and the subsequent light detector to form a direct wavefront sensor is expedient: a relatively large area is illuminated relatively evenly in the pupil plane, while in an image plane the light intensity would be focussed onto a substantially smaller surface area. The stream of photons can thus be distributed relatively evenly onto the different microlenses in the pupil plane and subsequent detector elements. It can thus be achieved that no single photon-counting detector element receives an intensity that is too high, i.e. the incidence of photons during a dead time of a detector element is largely avoided.

In the light microscope with an indirect wavefront measurement described by the Applicant in US 2015/0185454 A1 and DE 10 2013 015 931 A1, measurement occurs in the image plane where wavefront data cannot be measured directly but rather only reconstructed to a limited extent. Moreover, the confocally analysed sample point generates a very high light intensity on only a few detector elements in the sensor plane. It is thus not possible to design or operate the detector elements as photon-counting detector elements. Moreover, optical fibres are used in US 2015/0185454 A1 and DE 10 2013 0159 31 A1 to conduct light from the microlenses to the detector elements. This is not necessary according to the present invention; rather, it can be preferable for the photon-counting detector elements to be arranged directly behind the microlenses without any intermediate components. Numerous detector elements can thus be used per microlens in the pupil plane according to the invention, thus allowing the determination of the light focus position for the corresponding microlens and a precise measurement of the wavefront.

The electronics unit of a light microscope according to the invention can in particular be configured to determine, from every determined wavefront (every determined wavefront datum), a point spread function (PSF) for the corresponding sample point signal or signals. The PSF can in particular be determined from the wavefront via a Fourier transform and describes the data transfer or imaging by the light microscope. Knowing the PSF allows an adjusted computation of the captured sample point signals in a generally known manner in order to compute a sample image of improved quality. In particular, the determined point spread functions can be used in the computation of the sample image for a deconvolution of the sample point signals. Aberrations or effects of an optically complex medium can be compensated computationally in this manner.

A photon-counting detector element can in particular be understood to be a light detector element that is operated so as to emit the number of photons that it receives within a given period of time. Besides this operating mode, also known as the Geiger mode, some light detector elements can optionally also be operated in another mode, in which case they no longer constitute photon-counting detector elements. An example of a photon-counting detector element is a singe-photon avalanche diode (SPAD). A photon-counting detector element can emit an amplified signal as soon as it receives 1 photon; the number of amplified signals emitted corresponds to the number of received photons. A SPAD detector element has a substantially higher amplification compared with the detector elements normally used with Shack-Hartmann sensors. This allows such a detector element to be operated in Geiger mode, in contrast to Shack-Hartmann sensors used up until now.

An additional array of microlenses can also be provided in front of the SPAD array. The purpose of this additional array is to increase the fill factor, i.e. to direct ideally all incident light onto the corresponding subsequent detector element. The number of lenses in the additional microlens array can be equal to the number of detector elements. The additional microlens array can lie in the focal plane of the microlens array described in the foregoing.

A captured signal of a detector element is both used for the wavefront determination and added together with further signals (measurement signals) of other detector elements to form a sample point signal. This way, all captured signals can be used for generating the sample point signals and no part of the light is lost to a separate measurement of the wavefront.

In principle, a wavefront determination can occur solely on the basis of the simultaneously captured signals (photon counts) of different detector elements. However, in order to increase measurement precision, it can make sense to average over a plurality of successively captured signals. Due to the scanning movement of the illuminating light, successively captured signals emanate from different, adjacent sample points/sample areas. Depending on the sample medium, adjacent sample points can exhibit very similar aberrations or wavefront deformations. This is called an isoplanatic patch. This denotes a sample region with an essentially identical aberration or wavefront influence for light passing through it. Measurement precision can thus be increased when an averaging of the signals for the wavefront determination is limited precisely to a sample region corresponding to the isoplanatic patch. In some embodiment variants, the focus positions determined for the respective microlenses are thus averaged focus positions. An averaged focus position is computed by the electronics unit by averaging these signals, which were captured by the detector elements arranged behind the respective microlenses for different, successively illuminated sample points. It is thus possible to average the signals successively captured by the same detector element. This averaging is only performed for the wavefront determination and does not occur for the computation of the sample image points. An averaging can also be understood to denote an addition or some other aggregation of the signals.

The size of a sample area for which an averaged focus position is computed should ideally be adapted to an isoplanatic sample patch. In particular for this purpose, the electronics unit can be configured to:
  determine, initially for every successively illuminated sample point, respective current focus positions for a microlens with the respective detector elements,
  average this plurality of current focus positions (captured for the same microlens), wherein one of the averaged focus positions is computed in this manner,
  set the number of current focus positions to be averaged as a function of a difference between the successively captured current focus positions.

In a variant of this method, instead of averaging a plurality of focus positions, it is possible to respectively carry out an averaging (or addition) of the signals successively captured by the same detector element; the determination of the focus positions thus occurs afterwards, which also corresponds to an averaging over a plurality of successively analysed sample points.

The difference between the current focus positions successively determined by means of the same microlens is small within an isoplanatic patch. The difference between the current focus positions of the same microlens can thus be used as a criterion for determining whether the measurement data belong to an isoplanatic patch. For example, an averaging can be performed for all current focus positions so long as said difference does not exceed a predetermined threshold value. In principle, instead of a difference between the current focus positions, a difference between successive measurement signals of the same detector element can also be used as a criterion.

An undesired influencing of the sample light can be effectively compensated computationally by means of the described embodiment variants. Alternatively or additionally, it is also possible to carry out a correction of the illuminating light. An adaptive optic element can be provided in an illuminating light path for this purpose, either in a part of the illuminating light path in which illuminating light alone is conducted or in a common light path of illuminating light and sample light. With the adaptive optic element, it is possible to influence a wavefront of the illuminating light as well as, depending on the arrangement, a wavefront of the sample light in a variable manner. To this end, the adaptive optic element can set variable values of a phase delay over a beam cross-section. This can occur, for example, pixel by pixel with a micromirror array or with a deformable mirror or some other spatial light modulator. The electronics unit is configured to take the determined wavefronts into account when setting the adaptive optic element to correct the wavefront of the illuminating light. This correction allows the illuminating light to be imaged into the sample plane, in particular as a diffraction-limited light spot. The wavefront data can be used in particular both for the setting of the adaptive optic element as well as for the computation of the sample image.

Additionally or alternatively, it is also possible to provide an adaptive optic element, also called adaptive detection optic in the following, for manipulating the sample light. This is arranged in a detection light path, i.e. in a part of the microscope light path in which only sample light or in which alternatively illuminating light and sample light are conducted. With the adaptive detection optic, a wavefront of the sample light (as well as, depending on the arrangement, a wavefront of the illuminating light) is influenced in a variable manner over its cross-section. The electronics unit is in turn configured to take the determined wavefront data into account both for the computation of the sample image and for a setting of the adaptive detection optic.

For the sake of simplicity, the terms "adaptive optic" or "adaptive optic element" are used in the following discussion and are intended to comprise both the adaptive optic element for illuminating light as well as the adaptive detection optic unless expressly stated otherwise.

In conventional light microscopes with an adaptive optic, an adjustment of the adaptive optic occurs after a fixed or unvarying period or number of scanned sample points. In particular, in light of the low time resolution of conventional Shack-Hartmann sensors, an adjustment of the adaptive optic used to make sense each time a wavefront was determined. The substantially higher time resolution of the wavefront determination with the invention, on the other hand, allows, during the scan, a variable determination of when an adjustment of the adaptive optic element is appropriate. The electronics unit can thus be configured to vary, during a sample scan, a number of scanned sample points after which an adjustment of the adaptive optic element occurs, in particular independently of the extent to which the determined wavefront or determined wavefront data changes between successive sample points.

A feedback loop with an adjustment of the adaptive optic element gives rise to an additional time requirement. For this reason, among others, it can be expedient not to adjust the adaptive optic element after the scanning of each sample point. Moreover, a computation of the data for the setting of the adaptive optic element should occur in a manner that is as time-efficient as possible. While the computation of the sample image does not require a real-time computation of the wavefront, a process that works fast is particularly important for the adaptive optic element. It can thus be expedient to carry out a first, faster wavefront determination for setting the adaptive optic element and subsequently, in addition, a potentially more precise wavefront determination (from the same captured signals) for the sample image computation. Signals captured for two or more successively illuminated sample points can be loaded into a data buffer (i.e. a cache in which data is stored temporarily). The electronics unit carries out a data averaging of the signals temporarily stored in the data buffer (for example, the signals successively captured by each detector element can be added together or averaged). A focus determination and a determination of the wavefront are carried out on the basis of the averaged signals. A single wavefront is thus determined for two or more successively scanned sample points. The adaptive optic element is then set on the basis of the wavefront determined in this manner during the scanning of the sample. This creates a very fast mechanism for setting the adaptive optic element. As all signals are still saved, it is possible to carry out another averaging of the signals for the focus determination in order to adjust the sample point signals (for example, by having the number of signals to be averaged depend on the difference between successive signals, as described in the foregoing). A moving average calculation can also be implemented with the data buffer.

The electronics unit can be configured to save the signals of the detector elements that were captured for different sample points in a data memory. The signals are thus not only used in the computation of the sample image for a current imaging process. Rather, the stored signals can also be used for subsequent imaging processes. Determined wavefront data can be used for subsequently captured sample point signals provided that these signals were captured for the same sample points in relation to which the wavefront data was determined. Moreover, storage also allows the wavefront data to be subsequently evaluated in different ways. For example, the electronics unit can provide a user with different options regarding how the wavefront data is determined and how a sample image is computed from the signals. For example, the options can differ with respect to how successively captured wavefront data/focus positions are averaged, in particular in terms of the number of data to be averaged. This makes it possible to define isoplanatic areas of different sizes for the computation of a single sample image.

The light microscope of the invention can also be designed for a multipoint scan. In this case, the electronics unit and the optic elements for conducting illuminating light to a sample are configured to scan the sample simultaneously with two illuminating light beams. A beam splitter can be provided, in particular an array of lenses, in the area of an intermediate image plane (in the detection light path). Sample light is thereby split into different light paths, which lead to different parts of the microlens array with the detector elements located behind them. These parts of the microlens array can be designed as separate components or as a common microlens plate. The detector elements can likewise form two (or more) separate detector devices or be sections of the same array of detector elements behind the two (or more) parts of the microlens array.

An evaluation algorithm designed to determine the wavefront of the sample light from the plurality of determined focus positions (i.e. the focus positions determined over different microlenses) can be stored in the electronics unit. The evaluation algorithm can be trained with test data and in particular use a neural network in order to infer a wavefront from a pattern of focus positions.

The sample point signal computed from the (simultaneously) captured signals of the detector elements can also be a confocal signal. A pinhole in the illuminating light path produces a diffraction-limited point focus. A further pinhole in the detection light path (detection pinhole) is arranged in an intermediate image plane so as to realize a confocal imaging. However, in order to allow a measurement of the wavefront, the detection pinhole must not be too small. Otherwise, only an essentially spherical wavefront would be emitted from the detection pinhole. While a detection pinhole diameter of less than 1 Airy is used in confocal microscopy, a substantially larger detection pinhole diameter is used in the described variant of the invention, for example at least 2 or at least 3 Airy. In order for a sample point signal to be based ideally only on the sample light from a small sample area, it can be provided that, instead of the simultaneously captured signals of all detector elements, only those of some detector elements are added together. It is also possible to extract a confocal part from the signals captured for a sample point based on a mode decomposition of the electric field.

An active cooling device can be provided to cool the detector elements and thus reduce dark noise.

In the present description, "microlens array" can be understood to denote an arrangement of a plurality of microlenses next to one another, in a two-dimensional pattern. The term "microlens" is not intended to imply a limitation of the dimensions of a lens but rather can be understood to mean that a beam cross-section of incident light is larger than a lens diameter, for example at least 2 or 5 times larger.

The arrangement of the microlens array in the area of a pupil plane can be understood to mean that the microlens array is arranged in a pupil plane or in the vicinity of a pupil plane. This can be understood to mean in particular that the microlens array is located closer to a pupil plane than to the next (intermediate) image plane along the direction of light propagation.

The electronics unit can be constituted by in principle any electronic components or computing devices. Described functions of the electronics unit can be programmed in software or hardware. Parts of the electronics unit can also be arranged at a site at a distance from the rest of the light microscope and be communicatively connected, for example, via data cables or an internet connection.

The scanner can generally be understood to denote a device with which it is possible to adjust a deflection of light in a variable manner. To this end, for example, one or more movable, in particular tiltable, optic elements can be provided. The optic elements can be, for example, mirrors, lenses or prisms. The scanner directs the illuminating light successively onto different sample points.

In principle, the illuminating light can comprise light in any spectral range. It can be directed onto the sample in a pulsed manner or continuously. One or more lasers or other illuminating devices can be implemented as the light source. A plurality of fixed-phase pulse lasers for coherent processes like CARS or SRS can also be used as illuminating light or in addition to the illuminating light described here, wherein the light emitted for the coherent processes is also guided via the adaptive optic element. The illuminating light can be used in particular for fluorescence excitation, multiphoton excitation or confocal illumination. The sample light is emitted as a result of the irradiation with the illuminating light and can be of various types. For example, it can be fluorescent or phosphorescent light. The sample light can also be illuminating light scattered on the sample or be produced by other optical effects. In the case of a multiphoton excitation, a sample excitation can also be called the "guide star", wherein the sample light emanating from the "guide star" is measured and evaluated as described. The sample can also be provided with fluorescent beads so that emitters that facilitate a wavefront determination are provided in a targeted manner. In this case, it is possible to exploit the knowledge that the beads represent point emitters (so that a compensation of the measured aberrations should reveal a point light source), whereas other emitting sample areas do not necessarily represent point emitters.

A wavefront can be understood as a surface of the light, in particular of the sample light, on which the light has the same phase.

For the purposes of elucidation, numerous example embodiments comprising a determination of focus positions for determining a wavefront therefrom are described. In variants of these example embodiments, instead of determining a focus position, it is possible to determine some other wavefront datum from the captured intensity distributions. "Determining a wavefront" can thus be considered to denote the determination of a datum relating to the wavefront or of a measure of the wavefront.

The characteristics of the invention that have been described as additional features of the light microscope also yield, if implemented as intended, variants of the method according to the invention. Conversely, the light microscope can also be configured to carry out the described method variants. In particular the electronics unit can be configured to carry out the described method steps and to control the light source, the scanner, the light detector and other microscope components accordingly.

BRIEF DESCRIPTION OF THE DRAWINGS

Further advantages and features of the invention are described in the following with reference to the attached schematic figures.

DETAILED DESCRIPTION OF THE DRAWINGS

In general, similar components and components that function in a similar manner are designated in the figures by the same references.

Figure 1:
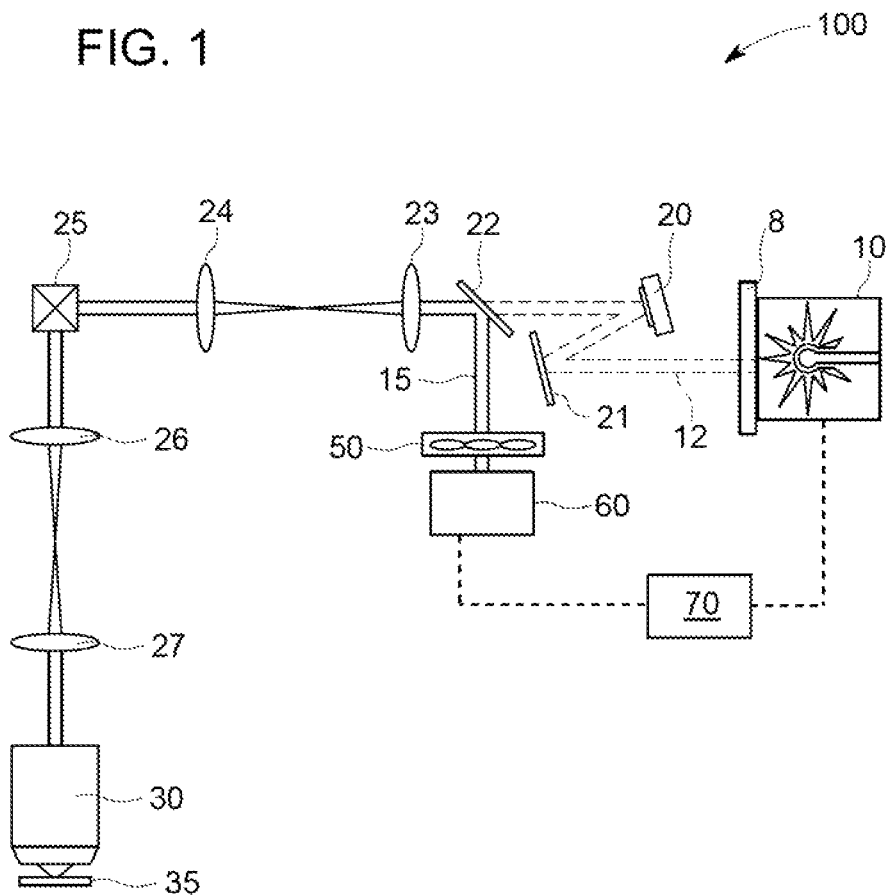
FIG. 1 is a schematic illustration of an example embodiment of a light microscope of the invention.

FIG. 1 shows an example embodiment of a light microscope 100 according to the invention designed as a laser scanning microscope.

The light microscope 100 comprises a light-source port 8 via which illuminating light 12 of a light source 10 can be coupled. The light source 10 illustratively comprises one or more lasers. Via optional optic elements (for example, a mirror arrangement not illustrated here), illuminating light from one or a plurality of lasers can be merged into the same light path.

A sample 35 is scanned with the illuminating light 12. This means that the illuminating light 12 is focussed on a sample point and different sample points are successively illuminated according to a scanning movement. A plurality of optic elements 21, 23, 24, 26, 27 and an objective 30 are provided for conducting the illuminating light 12 to the sample 35. A scanner 25 is used to scan the sample 35 with the illuminating light 12. The scanner 25 can comprise, for example, two movable scanning mirrors or some other number of scanning mirrors. In principle, any orientable beam deflection device is conceivable as the scanner, for example an acousto-optic beam deflector.

Sample light 15—which can be, for example, fluorescent light or phosphorescent light—is emitted by the sample 35. The illuminating light can in particular be radiated in pulses and be used for a multiphoton-fluorescence excitation. Sample light 15 is consequently only emitted from a particularly small sample area and has a shorter wavelength than the illuminating light 12.

In the illustrated descanned structure, the sample light 15 is returned via the objective 30, the scanner 25 and the optic elements 27, 26, 24, 23. It is spatially separated from the illuminating light 12 by means of a beam splitter 22. The beam splitter 22 can be designed, for example, to either reflect or transmit light depending on its wavelength. The sample light 15 is then guided via a microlens array 50 onto a light detector 60.

Figure 2:
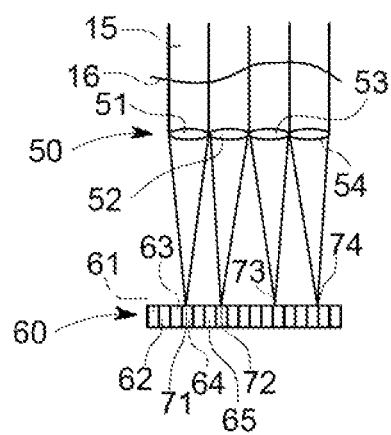
FIG. 2 shows an enlargement of a section of FIG. 1.

An enlargement of the microlens array 50 and the subsequent light detector 60 is illustrated in FIG. 2. The microlens array 50 comprises a plurality of microlenses 51-54 arranged next to one another in a two-dimensional pattern. The light detector 60 comprises a plurality of detector elements per microlens 51-54. In FIG. 2, a plurality of detector elements 61-65 are located behind the first microlens 51, while the detector elements behind the other microlenses 52-54 are not provided with reference numbers for the sake of clarity. A diameter of a microlens 51 is accordingly larger than a distance between adjacent detector elements 61, 62, for example at least 5 times larger.

The microlens array is arranged here in a pupil plane or in the area of a pupil plane. The advantage of this arrangement is explained in greater detail below. The distance of the detector elements 61-65 from the microlenses 51-54 is equal or essentially equal to the focal length of the microlenses 51-54. Focus positions 71-74 of sample light 15 on the detector elements thus depend on the shape of the wavefront 16 when it strikes the microlenses 51-54. A section of the wavefront 16 of the total sample-light cross-section can be analysed via each microlens 51-54 by means of a determination of the focus positions (i.e. a determination of the focus of the received light intensity/number of photons) with the respective detector elements 61-65 behind each microlens 51-54. The wavefront 16 can be computed from this plurality of focus positions 71-74. In more general terms, a wavefront datum that describes or characterizes the wavefront 16 can be determined from the respective intensity distributions behind the microlenses.

The wavefront 16 is influenced by media that the sample light 15 traverses. In particular optically complex samples or sample media thus have a relevant impact on the wavefront 16. In the case of biological samples, different cell components can have very different effects, in particular when deeper cell layers are analysed. Non-biological samples, for example electronic components, can also have complex structures that significantly influence the wavefront.

It is possible to improve the quality of a captured microscope image by means of a subsequent computation that uses the knowledge of the wavefront 16. Conventional microscopes use separate light detectors for the direct wavefront measurement and the capture of a microscope image. This is due to the fact that the sample image is captured by means of a very fast scan of the sample, which requires very fast detectors. The sensors used for wavefront measurement, however, are generally substantially slower. It is consequently not possible to allocate the signals measured by a wavefront sensor to a single sample point so that they are not used for the measurement of the sample image. A large part of the sample light intensity is thus lost in conventional microscopes as a result of the wavefront measurement and is not available for the capture of the sample image.

These drawbacks are overcome with the invention. The light microscope 100 uses the same light detector 60 and the same measurement data/signals captured by the same to determine both the wavefront as well as the sample point signals, from which an adjusted sample image that takes the determined wavefront into account is computed. Sample light that would otherwise not be available for the acquisition of the sample image is not diverted for a wavefront measurement.

In particular the aspects described in the following are relevant in this connection.

The light detector 60 has a complete readout rate of at least 100 kHz, which denotes the frequency at which all detector elements of the detector 60 are read out. The readout rate can thus be at least as high as the scan rate, i.e. the inverse readout frequency can be lower than or equal to the inverse pixel dwell time. In principle, it is sufficient when a part and not all of the detector elements of the light detector 60 are read out for a scanned sample point. The descriptions relating to detector elements 61-65 of the detector 60 can thus also be understood as referring to a part and not all of the detector elements. It is thus sufficient when the time for reading out the detector elements 61-65 used for the computation of the image is equal to or less than a pixel dwell time, while a time for reading out all detector elements could also be greater than the pixel dwell time.

Photon-counting detector elements can be preferable as detector elements 61-65, in particular single-photon avalanche diodes (SPAD). Photon-counting detector elements have a very high time resolution, which is substantially better than the time resolution of, for example, EMCCD sensors, which are often used for wavefront measurements. The photon-counting detector elements are operated so that their readout time (i.e. the duration of a photon count) corresponds to the pixel dwell time during which a sample point (pixel) is illuminated via the scanner. A photon count is carried out for each sample point.

In order for a photon-counting detector element to provide a precise result, it should reach saturation as rarely as possible. Following the reception of a photon and the triggering of a current avalanche, a dead time elapses before the next photon can be detected. In order for a saturation of the light detector to occur as rarely as possible, it is expedient when the light detector comprises a large number of detector elements, for example over 10,000, which are arranged behind a microlens array in the pupil plane. The sample light emitted by a sample point illuminates the pupil approximately evenly, i.e. substantially more evenly than an image plane. The parts of the sample light are thus distributed substantially more evenly onto the plurality of microlenses with their subsequent detector elements in the pupil plane.

In addition to the arrangement of the microlens array in the pupil plane, a setting of the illumination intensity or of an illumination pulse frequency is also relevant in order to ideally avoid a saturation of the light detector. The electronics unit can be configured to evaluate whether a saturation is probable based on the measurement signals of the detector elements captured up to that point during a scan. A saturation can be presumed, for example, when a photon count of one or more detector elements exceeds a predetermined threshold value. The electronics unit can then immediately reduce an illumination intensity and/or pulse frequency of the light source.

An electronics unit 70 controls the light detector 60, in particular the processes described for image capture such as the computation of wavefront data, the aggregation of measurement signals of the light detector to form a sample point signal/confocal signal, as well as the computation of a sample image from the plurality of successively captured sample point signals while taking into account the wavefront data. The electronics unit 70 can control further microscope components, in particular the light source 10, the adaptive optic element 20 and/or the scanner 25.

In the example embodiment shown in FIG. 1, the adaptive optic element 20 is located in the illuminating light path. In a variant of this embodiment, the adaptive optic element 20 can be arranged in a common light path of the illuminating light 12 and sample light 15, in particular between the beam splitter 22 and the objective 30. Sample light 15 in this case can also be conducted via the adaptive optic element 20, which can manipulate its wavefront.

In a variant of the example embodiment of FIG. 1, a pinhole aperture is added, for example in a conjugate plane of the sample plane in which the sample 35 is arranged. This plane can lie between the objective 30 and the beam splitter 22, in particular in the illustrated intermediate image plane between the optic elements 26 and 27 or in the intermediate image plane between the optic elements 23 and 24. In this case, the adaptive optic element 20 or a further adaptive optic element can be arranged between the sample 35 and the pinhole aperture.

Figure 3:
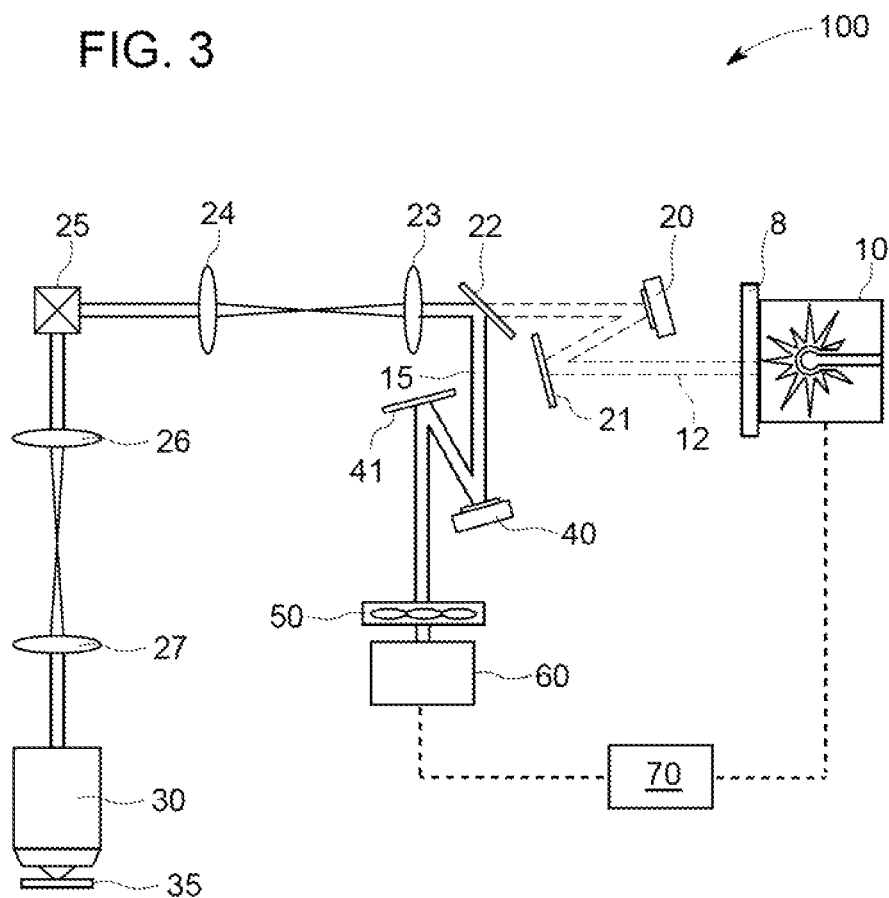
FIG. 3 is a schematic illustration of a further example embodiment of a light microscope of the invention.

A modified example embodiment is shown in FIG. 3. This embodiment differs from the one shown in FIG. 1 in that an adaptive detection optic 40 is added in the detection light path. The adaptive detection optic 40 can be formed like the adaptive optic element 20 described above. In the example illustrated in FIG. 3, sample light 15 first strikes the adaptive detection optic 40 and subsequently the microlens array 50, although this order can also be reversed. An optic element 41, here a mirror, for relaying the sample light 15 is depicted illustratively in FIG. 3. The adaptive detection optic 40 can be provided in addition to the adaptive optic element 20, as depicted, although alternatively the adaptive optic element 20 can also be omitted. The adaptive detection optic 40 can essentially be controlled by the electronics unit 70 as described for the adaptive optic element 20. In particular, the adaptive detection optic 40 can be adjusted during a sample scan as a function of the currently measured wavefront data.

Figure 4:
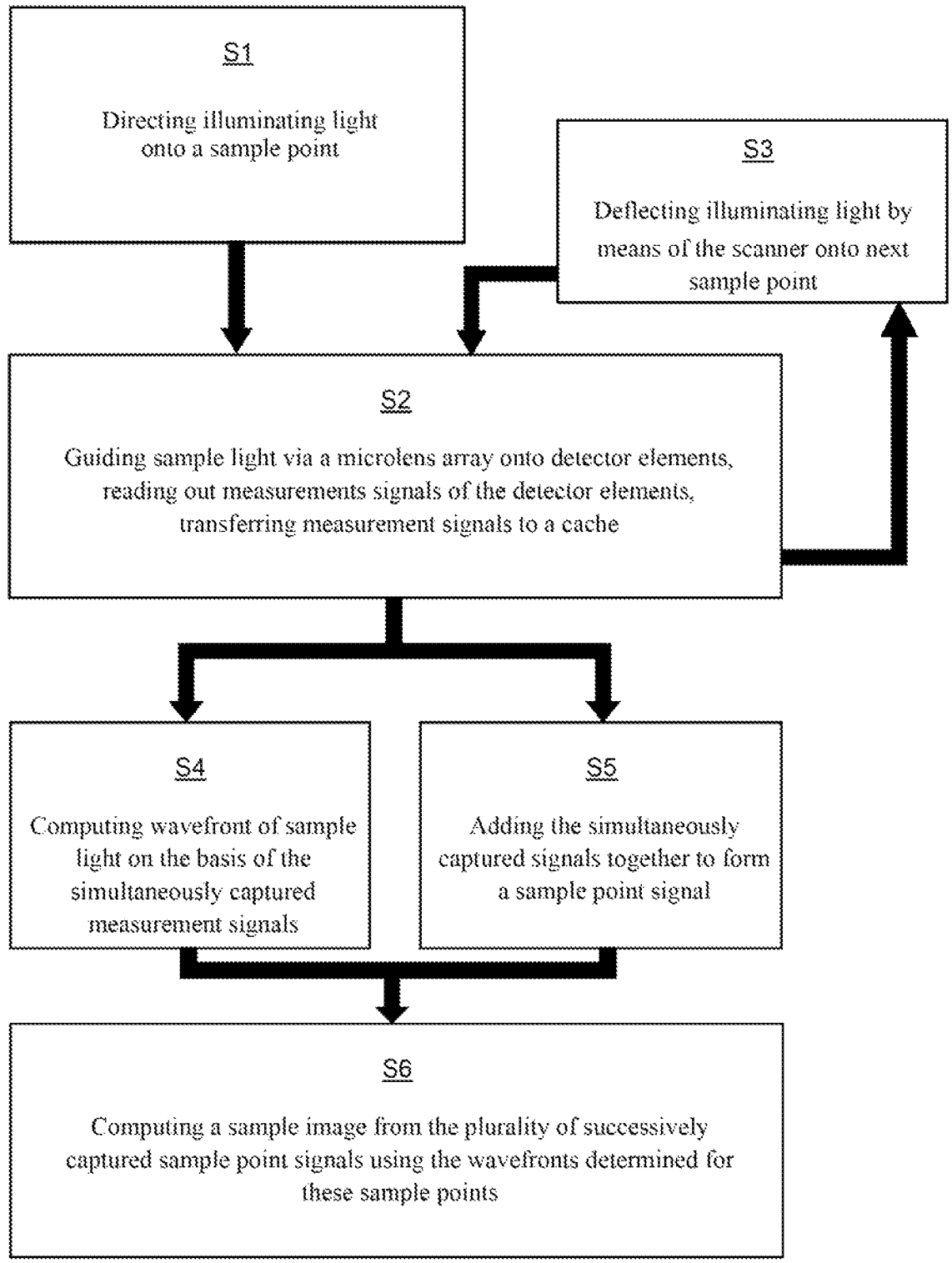
FIG. 4 shows schematically the process of a method of the invention.

The individual method steps for image capture and wavefront measurement are illustrated in FIG. 4. The electronics unit of an example embodiment of the light microscope according to the invention is configured to carry out these method steps in an automated manner, in particular by means of a corresponding control of the light source, the scanner and the light detector.

In method step S1, illuminating light is focussed on a sample point. The illuminating light can be, for example, a light pulse for multiphoton excitation.

According to step S2, sample light emanating from the sample point is conducted via the microlens array onto the detector elements. Following the pixel dwell time, which is determined by the speed of the scanner and the intended resolution, the measurement signals of the detector elements are read out. In the case of photon-counting detector elements, each measurement signal represents a measured number of photons. These measurement signals are temporarily stored in a data memory.

In step S3, the illumination light is deflected by means of the scanner onto a next sample point. The scanning movement can be carried out continuously whereby the steps S2 and S3 occur simultaneously. A division of the sample into sample areas can be assumed in this case, wherein a sample point is considered the same when the scanner moves the illuminating light within the same sample area; if the illuminating light hits a subsequent, adjacent sample area, this is designated a deflection to the next sample point.

Sample light is likewise measured for the next sample point and the corresponding measurement signals stored in the data memory/cache in accordance with step S2.

The entire sample or the entire region of interest (ROI) of the sample is scanned in this manner.

The steps S4 and S5 are carried out during the scanning of the sample or after the sample has been entirely scanned.

In step S4, a focus position is computed for each microlens from the measurement signals. A wavefront, i.e., for example, the wavefront at the objective pupil, is computed on this basis. For a better signal-to-noise ratio, the measurement signals relating to the same microlens that have been captured for successive sample points can also be combined or added together and used conjointly for the determination of the wavefront. In this case, an individual wavefront is not determined for each sample point. Rather, a wavefront is respectively computed for given areas. This is suitable when the regions essentially correspond to a so-called isoplanatic patch.

It can be expedient for the determination of the wavefronts to be carried out very quickly during scanning. To this end, the determination of the focus positions can be carried out in parallel, for example in a graphics processing unit (GPU). This method is particularly well suited to the determination of the focus positions as the allocation of the sensor elements to the microlenses and thus to the lateral areas of the wavefront is fixed in advance. A processor within the GPU can thus be allocated to each microlens so that the algorithm for determining the focus position can be applied simultaneously for each microlens within the array.

In step S5, the measurement signals captured with the plurality of detector elements for a sample point are combined. In particular the measurement signals of all detector elements, i.e. all simultaneously captured signals, can be added together/integrated. This yields a sample point signal. A sample point signal is thus captured per scanned sample point. The sample point signal can consequently be based on the entirety of the sample light detected simultaneously. No part of the sample light, which would otherwise be lost for the sample point signal, is diverted for wavefront measurement. Rather, the wavefront(s) and the sample point signals are determined from the same measurement signals. In particular, all measurement signals can be used both for the wavefront determination and for the determination of the sample point signals.

After the entire sample has been scanned, step S6 follows. A sample image is computed in this step from the sample point signals while taking into account the determined wavefronts. This can be achieved, for example, by combining the sample point signals into a raw image. Each sample point signal corresponds to an image point of the raw image. A deconvolution of the raw image is then carried out, for which the determined wavefronts are used. The deconvolution occurs separately for different raw image areas, a wavefront having been respectively determined for each raw image area. The raw image areas can be set according to isoplanatic patches. To this end, it is possible to identify a change in successive focus positions determined for the same microlens, i.e. a difference in the focus position of a microlens for different, successively illuminated sample points. There are only slight changes in the scanned medium within the isoplanatic patch so that the changes in the focus positions behind the respective microlenses are consequently also slight. If the change remains below a predefined threshold value, an isoplanatic path can be assumed. The focus positions of the same microlens for these successively illuminated sample points are added together accordingly and used conjointly for the determination of a wavefront region. It is also possible to use a plurality of focus positions for the comparison with the threshold value and the assessment of how far an isoplanatic patch extends. It can, however, also be expedient to average areas exhibiting a strong variation. It is possible, for example, to take into account only certain aberration orders this way. The flexibility of the spatial averaging of the aberrations via certain focus positions is an essential difference vis-à-vis conventional methods in which the number of sample points over which measurement signals for the computation of the wavefront are averaged is determined in advance. This number can be set in a variable manner with the invention. In particular, the measurement signals relating to different quantities of sample points are used to compute a wavefront for a single sample image in an area-dependent manner. In this manner, a sample image is output in step S6, the image quality of which is improved compared to conventional methods. Step S6 can optionally provide a user with different options as to how the wavefront data is to be determined and a sample image computed from the signals. The options can differ in particular with respect to how successively captured wavefront data/focus positions are averaged, in particular in terms of the number of signals for successively scanned sample points to be averaged. This makes it possible to define isoplanatic areas of different sizes for the computation of a single sample image.

Figure 5:
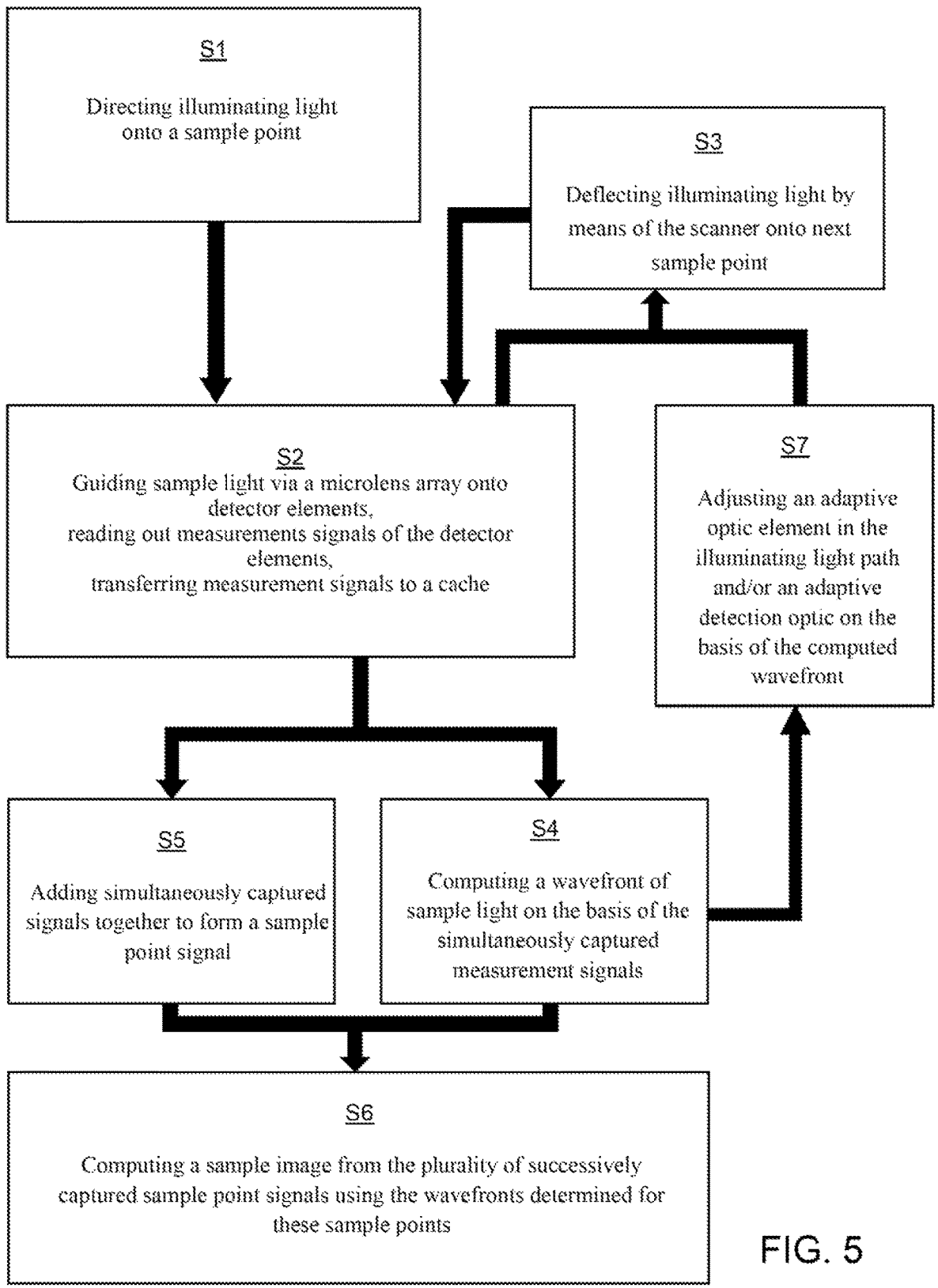
FIG. 5 shows schematically the process of a further method variant of the invention.

By taking the determined wavefront into account in the adjusted computation of the sample point signals as described, undesired aberrations of the sample light can be effectively compensated. An adaptive optic does not have to be provided for this purpose. This makes it possible to realize a fast imaging at a lower cost since a slower correction via a feedback loop and an adaptive optic is no longer necessary. An alternative method variant in which a feedback loop with an adaptive optic is used is illustrated in FIG. 5. This illustration differs from the preceding figure in that the wavefront determined in step S4 is already used during the scan. Step S7, in which the wavefront determined for one or more sample points is used to set an adaptive optic element in the illuminating light path, thus follows step S4. Illuminating light is emitted onto the next sample point with this setting the next time step S2 is carried out. Alternatively or in addition to the setting of an adaptive optic element in the illuminating light path, it is also possible to set an adaptive detection optic in step S7, in which case the steps S7 and S3 can also occur simultaneously.

Adjusting the adaptive optic element can take longer than an adjustment of the scanner, i.e. the cycle of the steps S2 and S3 shown in FIG. 5 can occur more often than the step S7.

Alternatively, it is also possible to carry out a plurality of settings of the adaptive optic element for a sample point to be scanned in rapid succession. This way, it is possible to try out different settings of the adaptive optic element for the same scanning position in order to test different aberrations. FIG. 5 illustrates a variant of this embodiment in that the scanner adjustment of step S3 does not always follow the adjustment of the adaptive optic element in step S7, but rather it is also possible to go directly to step S2. Step S4 only occurs optionally between the steps S2 and S7, as the data evaluation of the steps S4 and S5 can generally only be carried out upon completion of a sample scan.

The adaptive optic element 20 can be, for example, a spatial light modulator (SLM) or a deformable mirror. As step S4 is carried out before the scan for the sample image determination is completed, the data regarding the wavefront can be used to set the adaptive optic element 20 in step S7. The adaptive optic element 20 is set so that a generated wavefront deformation is at least partially compensated. The aforementioned features can apply, additionally or alternatively, to the adaptive detection optic 40. For good results, the illuminating light should still be directed at the same isoplanatic patch for which the wavefront was determined in step S4. This advantage can also be exploited in multipoint scanning with a plurality of illuminating points, as described in greater detail in the following.

The captured data regarding the wavefront can also be stored for the realization of subsequent images of the same sample. The data regarding the wavefront can thereby be subsequently evaluated in different ways in order to compute a sample image ideally unaffected by undesired aberrations.

In a variant of the embodiment of FIG. 1, a plurality of illuminating points scan the sample simultaneously and at a distance from one another. The illuminating points can be produced by a plurality of units of the light source 10, for example a plurality of lasers, or by a spatial splitting of the illuminating light 12. A plurality of sample light beams caused by different illuminating points are to be detected separately. To this end, a sample-light beam splitter can be arranged in front of the microlens array 50, in particular between the beam splitter 22 and the microlens array 50. The sample-light beam splitter can be arranged in an intermediate image plane and be, for example, an array of lenses or an array of mirrors. Sample light beams caused by different illuminating points are thereby guided into different detection light paths, in which a microlens array with a subsequent light detector is respectively arranged. The detection light paths can lead to different areas of the same microlens array so that different sample light beams hit different detector elements. This way, a plurality of sample areas can be scanned simultaneously.

The illuminating beams can either be guided over separate sample areas or successively scan the same sample areas. It can be expedient for an enhanced image quality to scan the same sample point repeatedly. In this case, as described above, the wavefront data that was determined for a sample point can also be used for the setting of the illumination intensity and/or of the adaptive optic element during the repeated scanning of the same sample point. For example, if the illumination intensity was too high for this sample point during the first scan, the illumination intensity is (temporarily) reduced. Moreover, the adaptive optic element can be set so that a wavefront deformation from this sample point is at least partially compensated. A separate adaptive optic element can be used for each illuminating light beam, wherein the latter should be clearly propagated from a pupil plane so that the individual illuminating light beams can be addressed separately by the adaptive optic elements. The definition of the isoplanatic patches in advance then merely represents a precondition for the determination of the wavefront data, which is adapted to the sample or the sample region according to the described method.

Conventionally, the size and position of the sample areas for which the adaptive optic element is to adopt a given correction setting are defined in advance, i.e. before the start of the scan. The type of correction setting performed occurs as a function of data captured during the scan. The size and the position of the sample areas for which the correction setting is carried out with the adaptive optic element, however, are fixed. With the invention, on the other hand, it is possible to define the size and position of the sample areas for which the same setting is performed with the adaptive optic element in a variable manner during the scan.

It is thus possible with the light microscope of the present invention to improve the quality of a sample image using a wavefront measurement without losing any part of the sample light for the capture of the sample image as a result of the wavefront measurement.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCES

8 Light source port
10 Light source
12 Illuminating light
15 Sample light
16 Wavefront
20 Adaptive optic element
21, 23, 24, 26, 27 Optic elements
22 Beam splitter
25 Scanner
30 Objective
35 Sample
40 Adaptive detection optic
41 Optic element
50 Microlens array
51-54 Microlenses of the microlens array
60 Light detector
61-65 Detector elements of the light detector
70 Electronics unit
71-74 Focus positions behind the microlenses 51-54
100 Light microscope
S1-S7 Method steps

What is claimed is:

1. A light microscope comprising:
a scanner for scanning a sample with illuminating light;
a light detector for measuring sample light;
a microlens array, which comprises a plurality of microlenses and is arranged in the area of a pupil plane;
wherein a plurality of detector elements of the light detector are respectively arranged behind each microlens;
wherein the light detector has a complete readout frequency of at least 100 kHz; and
an electronics unit configured to
measure intensity distributions with the detector elements arranged behind the respective microlenses and derive a wavefront datum regarding the sample light therefrom,
compute a sample point signal from signals of the detector elements,
successively direct illuminating light onto different sample points with the scanner and capture corresponding sample point signals, wherein, for at least some of the different sample points, a corresponding wavefront datum regarding the sample light is determined.

2. The light microscope according to claim 1,
wherein the electronics unit is configured to
compute a sample image from the plurality of sample point signals, wherein the wavefront data determined with said detector elements is taken into account for the computation of the sample image.

3. The light microscope according to claim 1,
wherein the electronics unit is configured to
respectively determine a focus position from the respective intensity distributions behind each microlens and derive the wavefront datum from the plurality of focus positions determined in this manner.

4. The light microscope according to claim 1,
wherein the electronics unit is configured to
determine point spread functions for the corresponding sample point signal or signals from the determined wavefront data and
use the determined point spread functions for a deconvolution of the sample point signals in the computation of the sample image.

5. The light microscope according to claim 3,
wherein the focus positions determined for the respective microlenses are averaged focus positions, the electronics unit accordingly being configured to
average or sum signals captured by the detector elements arranged behind the respective microlenses for different, successively illuminated sample points.

6. The light microscope according to claim 1,
wherein to adapt a sample area size, for which an averaged focus position is computed, to an isoplanatic sample patch, the electronics unit is configured to
determine, initially for every successively illuminated sample point, respective current focus positions with the respective detector elements for one of the microlenses,
average a plurality of current focus positions, wherein a number of the current focus positions to be averaged is set as a function of a difference between the successive current focus positions.

7. The light microscope according to claim 1,
further comprising an adaptive optic element in an illuminating light path, with which a wavefront of the illuminating light can be influenced in a variable manner over its cross-section,
and the electronics unit is further configured to take the determined wavefront data into account both for the computation of the sample image and for a setting of the adaptive optic element.

8. The light microscope according to claim 1,
further comprising an adaptive detection optic in a detection light path, with which a wavefront of the sample light can be influenced in a variable manner over its cross-section,
and the electronics unit is configured to take the determined wavefront data into account both for the calculation of the sample image and for a setting of the adaptive detection optic.

9. The light microscope according to claim 7,
wherein the electronics unit is configured to vary a number of scanned sample points after which an adjustment of the adaptive optic element or of the adaptive detection optic occurs during a sample scan, in dependence of an extent to which the determined wavefront data changes between successive sample points.

10. The light microscope according to claim 7, further comprising a data buffer;
wherein the electronics unit is configured to
load signals captured for two or more successively illuminated sample points into the data buffer during the scanning of the sample,
carry out a data averaging of signals temporarily stored in the data buffer,
derive a current wavefront datum from the averaged signals and
set the adaptive optic element or the adaptive detection optic based on the current wavefront datum determined in this manner during the scanning of the sample.

11. The light microscope according to claim 9, wherein the computation of the current wavefronts carried out during the scanning of the sample for setting the adaptive optic element or the adaptive detection optic is different, at least in terms of its data averaging, from the determination of the wavefronts that are used for the computation of the sample image after a complete scan of the sample.

12. The light microscope according to claim 1, wherein the electronics unit is configured to
save the signals of the detector elements that were captured for different sample points in a data memory,
provide a user with different options regarding how the wavefront data is determined and a sample image is computed from the signals.

13. The light microscope according to claim 1, further comprising an adaptive detection optic and optic elements for guiding illuminating light to a sample, wherein the electronics unit and the optic elements are configured to scan the sample simultaneously with two or more illuminating light beams,
the light microscope further comprising a beam splitter in the area of an intermediate image plane, whereby sample light beams caused by different illuminating light beams are split into different light paths which lead to different parts of the microlens array with the detector elements located behind them or which lead to the adaptive detection optic.

14. The light microscope according to claim 3, wherein an evaluation algorithm is stored in the electronics unit which is designed to determine a wavefront of the sample light from the plurality of determined focus positions.

15. The light microscope according to claim 1, wherein the electronics unit is configured to compute a confocal signal as the sample point signal from signals captured by the detector elements for the same sample point.

16. The light microscope according to claim 1, wherein the detector elements are photon-counting detector elements.

17. A microscopy method, comprising the steps:
scanning a sample with illuminating light by means of a scanner;
guiding sample light from the sample to a light detector by means of a microlens array;
wherein the microlens array comprises a plurality of microlenses and is arranged in a region of a pupil plane;
wherein the light detector comprises a plurality of detector elements and a plurality of the detector elements are respectively arranged behind each microlens;
reading out the detector elements with a frequency which is within a pixel dwell time with which the scanning of the sample is carried out;
measuring intensity distributions with the detector elements arranged behind the microlenses and deriving a wavefront datum regarding the sample light therefrom;
computing a sample point signal from signals of the detector elements;
successively deflecting illuminating light onto different sample points with the scanner and capturing corresponding sample point signals, wherein, for at least some of the different sample points, a corresponding wavefront datum regarding the sample light is also determined.

18. The light microscope of claim 16, wherein the photon-counting detector elements are single-photon avalanche diodes.

* * * * *